United States Patent [19]

Fujiwara et al.

[11] Patent Number: 5,213,047
[45] Date of Patent: May 25, 1993

[54] PROPULSION SYSTEM FOR MAGNETICALLY LEVITATED VEHICLE

[75] Inventors: Shunsuke Fujiwara, Tokyo; Yoshihiro Jizo; Hidenari Akagi, both of Amagasaki, all of Japan

[73] Assignees: Railway Technical Research Institute; Mitsubishi Denki Kabushiki Kaisha, both of Tokyo, Japan

[21] Appl. No.: 795,998

[22] Filed: Nov. 22, 1991

[30] Foreign Application Priority Data

Nov. 30, 1990 [JP]  Japan .................................. 2-337534

[51] Int. Cl.$^5$ ............................................. B60L 13/04
[52] U.S. Cl. .................................... 104/281; 104/292
[58] Field of Search ............... 104/281, 282, 285, 286, 104/287, 290, 292, 294, 295, 298

[56] References Cited

U.S. PATENT DOCUMENTS

| | | | |
|---|---|---|---|
| 3,890,906 | 6/1975 | Maki | 104/292 |
| 3,952,668 | 4/1976 | Urankar | 104/281 |
| 4,299,173 | 11/1981 | Arima et al. | 104/281 |

OTHER PUBLICATIONS

LD-89-27, Linear Drive Research Division, Society of Electronic Engineers, 1989.
LD-89-27, Oct. 6, 1989, H. Yamaguchi, "Fluctuation of Electromagnetic Force of LSM for Repulsive Magnetic Levitation System".
LD-90-36, H. Yamaguchi et al., "Fluctuation of Electromagnetic Force of SCM Caused by Harmonic Current in LSM Coils", Sep. 12, 1990.

*Primary Examiner*—Robert J. Oberleitner
*Assistant Examiner*—Kevin D. Rutherford
*Attorney, Agent, or Firm*—Oblon, Spivak, McClelland, Maier & Neustadt

[57] ABSTRACT

An improved propulsion system for a magnetically levitated vehicle comprising a vehicle mounted superconductor coil and a propulsion coil comprising an inner and outer coil wherein the levels of mutual inductance developed between the inner propulsion coil and the superconductor coil is about the same as the mutual inductance developed between the outer propulsion coil and the superconductor coil.

9 Claims, 3 Drawing Sheets

PROPULSION SYSTEM FOR MAGNETICALLY LEVITATED VEHICLE

BACKGROUND OF THE INVENTION

1. Field of the Invention

The present invention relates to a propulsion system for a magnetically levitated vehicle and, more particularly, to the construction of the fixed propulsion coils which interact with the superconducting coil mounted on the levitated vehicle so as to propel the vehicle.

2. Description of the Prior Art:

FIG. 5 is a plan view showing the positional relationship between the superconductor coil mounted on the levitated vehicle, identified as 1, and the propulsion coil mounted on the ground, identified as 4. The propulsion coil shown at 4 is a three phase coil wherein each coil is located in the same plane as every other coil, this design propulsion is disclosed in document LD-89-27 of Linear Drive Research Division, Society of Electronic Engineers.

The superconductor coil 1 may be excited at either the north or south poles, more particularly, the superconducting coil are excited at the north and south poles which are arranged alternatingly at a pole pitch $l_{tp}$, thus forming the field poles of the synchronous motor. The propulsion coil 4 further has coils of three phases U, V and W which are arranged at a pitch $l_{rp}$ which is two-third the pitch $l_{tp}$ of the superconducting coil 1, thus forming the armature of the linear synchronous motor.

An alternative prior art arrangement is illustrated in FIG. 6 which is the plan view showing the positional relationship between the superconductor coil mounted on a vehicle and the propulsion coil mounted on the ground. In this embodiment, the propulsion coils comprise a double-layered three phase coil as disclosed in document LD-89-27 of the Linear Drive Research Division, Society of Electronic Engineers, referred to previously. In FIG. 6, item 14 denotes the propulsion coil which is a double-layered structure composed of an inner coil 14a and an outer coil 14b. The inner coil 14a has a length which is equal to the pole pitch $l_{tp}$ of the superconductor coil 1 and arranged at a pitch which is 4/3 $l_{tp}$. The outer coil 14b has the same construction as the inner coil 14a. The same phases of both coils 14a and 14b are arranged at a pitch represented by $2l_{tp}$.

In the single layer propulsion coil is employed three phase electrical power of a phase and frequency synchronous with the position and speed of the vehicle is supplied to the propulsion 4 from a variable-voltage, variable-frequency power supply which is not illustrated. As a consequence, a propulsion force is generated which acts on the superconductor coil 1 on the vehicle to propel the vehicle forward at the desired speed. When this propelling relationship is viewed from the vehicle, an electromagnetic pulsation having a main pulsating component of a wavelength corresponding to the pitch of the propulsion coil 4 is generated which electro-magnetically vibrate the superconductor coil 1 on the vehicle. Since the three coils of U, V and W of the propulsion coil 4 are arranged between a pair of poles on the superconductor coil 1, the electromagnetic pulsation forms a frequency of the third order with the main component of the electromagnetic pulsation being caused by the space higher harmonic magnetic field components of the second order, with respect to the fundamental frequency of the propulsion current, wherein this may be represented by the formula: $F_1 = V/2l_{tp}$, wherein V represents the speed of the vehicle in meters per second, $l_{tp}$ represents the pole pitch in meters of the superconductor coil.

The pulsating magnetic force causes the on-board superconducting coil to oscillate, i.e., it mechanically vibrates. This vibration causes the cryogenic container to vibrate with the superconductor coil. Such vibrations are transmitted to the remainder of the vehicle to create undesired vibrational effects. In addition, an eddy current may be generated in the container holding the superconduction coil which can cause the coolant, normally liquid helium, to vaporize to cause still further difficulties. In addition, the vibration is amplified when it is in a resonant condition as the car speed increases. It is well known that in magnetically levitated vehicle propulsion when one has a single layer three phase coil, the electromagnetic pulsation acts on the superconductor coil 1 as a progressive wave, which excites the superconductor coil with a frequency which is proportional to the vehicle speed.

The other coil arrangement illustrated in FIG. 6 for propelling the magnetically levitated vehicle employs a two-layered three phase coil. The use of the two-layered three phase coil can significantly reduce the second order space higher harmonic magnetic fields generated in the propulsion system using the single layer three phase coil which thereby substantially eliminates the vibration of the superconducting magnetic coil. When using the two-layered coil, the main space higher harmonic magnetic field is of the fifth order and frequency is of the sixth order. The magnitude of the space higher harmonic component usually decreases as the order number increases. Consequently, the utilization of a two-layered coil in the propulsion system may substantially decrease the magnitude of the electromagnetic pulsation acting on the superconducting coil 1 during the operation of the vehicle as compared with the propulsion system employing only a single layered three phase coil.

However, the solution offered by the arrangement of FIG. 6 introduces a new problem, electromagnetic pulsation of the pitch of the propulsion coil 14 of the same layer which is $4/3l_{tp}$, i.e., an electromagnetic pulsation caused by a space higher harmonic magnetic field of 0.5 order acts on the superconductor coil 1. The electromagnetic pulsating force has a frequency of the 1.5 order and comprises as much as 26% of the propulsion force in terms of left and right magnetic force components which are considered to be the components producing the worst effect on the superconductor coil 1. As a consequence, a pulsating magnetic force in the lateral direction is generated which also induces undesired vibration as well as reduced energy efficiency.

Accordingly, a need continues to exist for minimizing pulsating magnetic forces in magnetically levitated vehicles propelled by linear motors. In particular, a need continues to exist for a linear motor which is substantially free of vibrations caused by third harmonic and the 1.5 harmonic.

SUMMARY OF THE INVENTION

It is an object of the present invention to provide a magnetically levitated vehicle propulsion system which can reduce electromagnetic pulsating forces which adversely affect the superconductor coil and which can stably propel the vehicle.

It is a further object of this invention to simultaneously reduce both the third and 1.5 harmonic frequencies.

These and other objects of the invention which will become apparent hereafter, have been achieved by providing a two-layered propulsion coil wherein the inner and outer coils produce different levels of electromagnetic force. In particular, wherein the electromagnetic forces of the inner and outer coils are adjusted such that the electromagnetic force applied by both the inner and outer coils on the superconducting coil are the same.

In this specification, the term superconductor coil refers to the coil mounted on the moving vehicle while the propulsion coil refers to the coil mounted on the ground.

DESCRIPTION OF THE PREFERRED EMBODIMENT

Figure 1A:
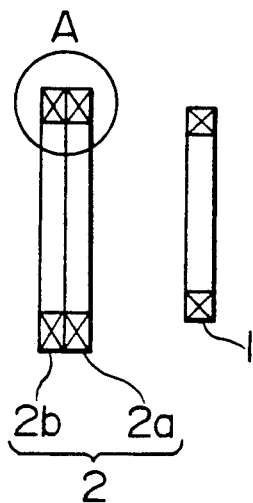
FIG. 1A is a sectional view illustrating the positional relationship between the superconductor coil and the propulsion coil and FIG. 1B is an enlarged sectional view of segment A shown in FIG. 1 to illustrate one embodiment of the present invention.

The magnetically levitated vehicle propulsion system of the present invention reduces the electromagnetic pulsating force having a frequency of an order of 1.5 which is caused by a space higher harmonic magnetic field order of 0.5 while minimizing the adverse effects caused by the third harmonic frequency. That is, the present invention is able to maintain the advantage of the double-layered coil propulsion system while simultaneously minimizing its disadvantages. The result has been achieved by the discovery that the lateral pulsating force which is induced on the vehicle when using a double-layered propulsion coil system is caused because the superconducting coil is subjected to different magnetic forces between the inner and outer layers of the propulsion coil system. That is, in the prior art both the inner and outer coils generated the same magnetic forces. It had been assumed that since these two coils were in very close spatial relationship with one another typically the inner and outer coils are separated by a space of only 1 mm, that, substantially the same magnetic force would be acting on the superconductor coil whether that magnetic force was generated by the inner or outer propulsion coils. It has now been discovered that the cause of the space higher magnetic field of 0.5 order is caused by the fact that the superconducting coil is subject to a stronger magnetic field from the propulsion coil nearest the vehicle than from that furthest away from the vehicle.

Based on this discovery, it is possible to eliminate the 0.5 space harmonic magnetic field by adjusting the magnetic strengths of the inner and outer layer coils such that the inner and outer layer coils when viewed from the position of the supercooled coil on the vehicle is the same. That is, the coil closest to the vehicle should have a lower absolute magnetic force than that further away. The relative magnetic fields are selected such that the magnetic strength of both the inner and outer fields of the propulsion coils is approximately the same when measured from the position of the superconducting coil of the vehicle. Preferably, the difference between the inner and outer coils magnetic forces is such that the lateral pulsating force on the vehicle in motion is less than 10% of the propulsion force and more preferably less than 5% of the propulsion force. That is, the relative magnetic strength of the inner and outer coils on the propulsion coils are selected so as to minimize the lateral pulsating magnetic force. In a particularly preferred embodiment, the magnetic forces are chosen such that the pulsating magnetic force is essentially eliminated.

Various methods may be utilized for altering the magnetic force of the inner and outer coils. For instance, the coil closest to the levitated vehicle may have fewer turns than the coil further away. A second alternative is to utilize the same number of turns in both the inner and outer coils but to vary the current flowing through each such that the magnetic force when measured from the superconducting coil which is generated by both the inner and outer propulsion coils is substantially the same. A combination of these techniques may also be employed to achieve the desired effect.

When the lateral pulsating force as a percentage of the total propulsion force is less than 10% and preferably less than 5%, the vibrations caused by the pulsating magnetic force are so small as to not be noticeable by the passengers on the magnetic vehicle. Furthermore, the efficiency in the utilization of the electrical energy is maximized.

Figure 1B:
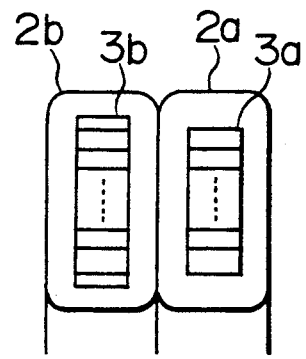

The present invention will now be described in greater detail with reference to the drawing figures. FIG. 1A is a sectional view showing the positional relationship between a superconductor coil and a propulsion coil in an embodiment of the present invention, while FIG. 1B is an enlarged sectional view of a portion marked A. Numeral 1 denotes a superconductor coil which is mounted on a vehicle and which is of the same construction as those in the known systems described before. Numeral 2 denotes a propulsion coil composed of two layers: an inner coil 2a and an outer coil 2b. As shown in FIG. 1B, the number of turns of the outer coil conductor 3b is greater than that of the inner coil conductor 3a so that the levels of mutual inductance developed between both coils and the superconductor coil 1 are the same.

In the magnetically levitated vehicle propulsion system, it is possible to substantially nullify the space higher harmonic magnetic field components which are produced by the propulsion system of the type employing single-layered three phase coil. It is also possible to eliminate undesirable effects produced by electromagnetic pulsation force of 1.5 order caused by the 0.5 order space higher harmonic magnetic field which is developed in the known propulsion system of the type employing double-layered three phase coil due to the difference between the superconductor coil 1 and the inner coil 2a and the distance between the superconductor coil 1 and the outer coil 2b.

Figure 2:
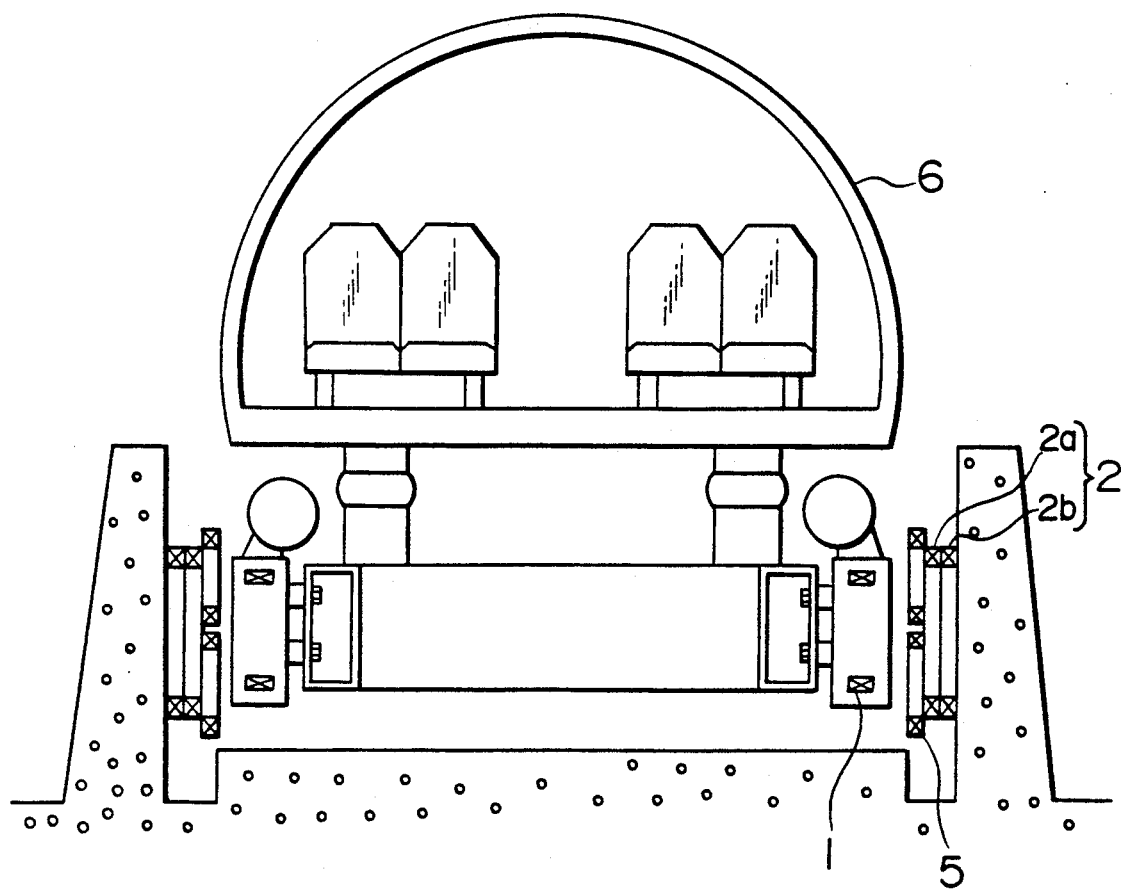
FIG. 2 is a sectional view of a magnetically levitated vehicle illustrating the various components involved in both levitation and propulsion.

FIG. 2 is a sectional view of an embodiment of the magnetically floated vehicle propulsion system in accordance with the present invention. A superconductor coil 1 is disposed on the bottom of a vehicle chassis 6, while a propulsion coil 2 composed of an outer coil 2b and an inner coil 2a is laid outside the track rail. Numeral 5 denotes a suspending or floating coil which levitates the vehicle.

The vehicle chassis 6 stably runs while being magnetically levitated, by interaction of the floating coil 5, propulsion coil 2 and the superconductor coil 1.

Figure 3:
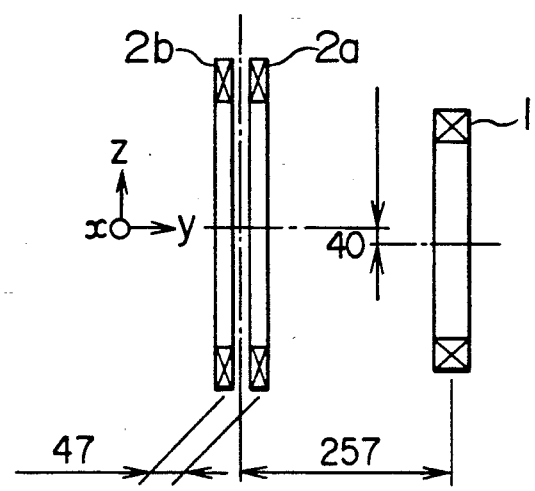
FIG. 3 is a sectional view showing the spatial relationship in an embodiment of the present invention.
Figure 4:
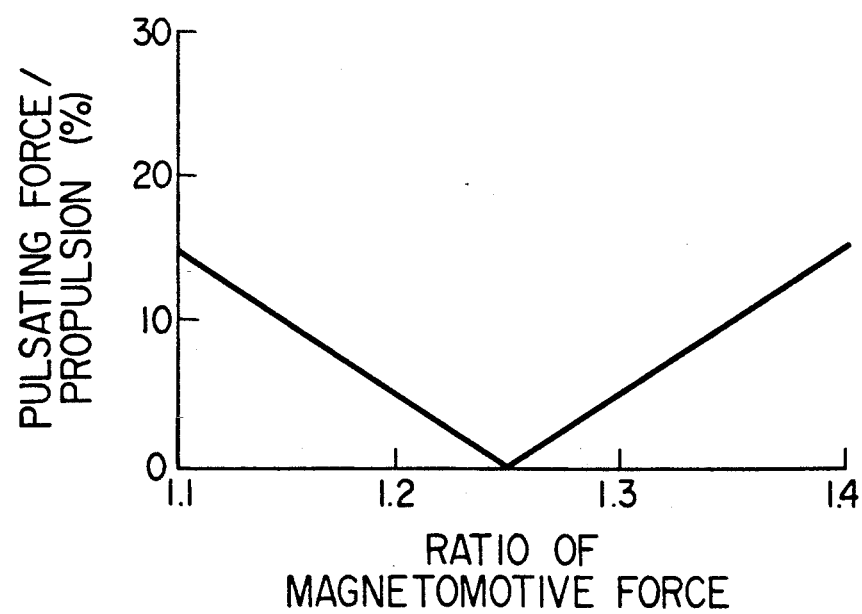
FIG. 4 is a diagram illustrating the relationship between the electromagnetic pulsating force and the ratio of electromagnetic forces between the inner and outer coil in the embodiment of FIG. 3.
Figure 5:
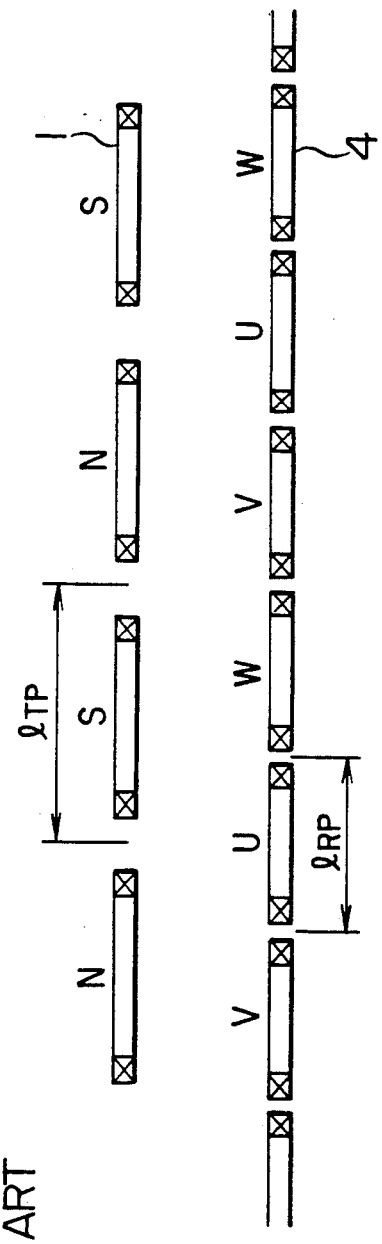
FIGS. 5 and 6 illustrate the prior art techniques for arranging the propulsion coil and superconducting coils.
Figure 6:
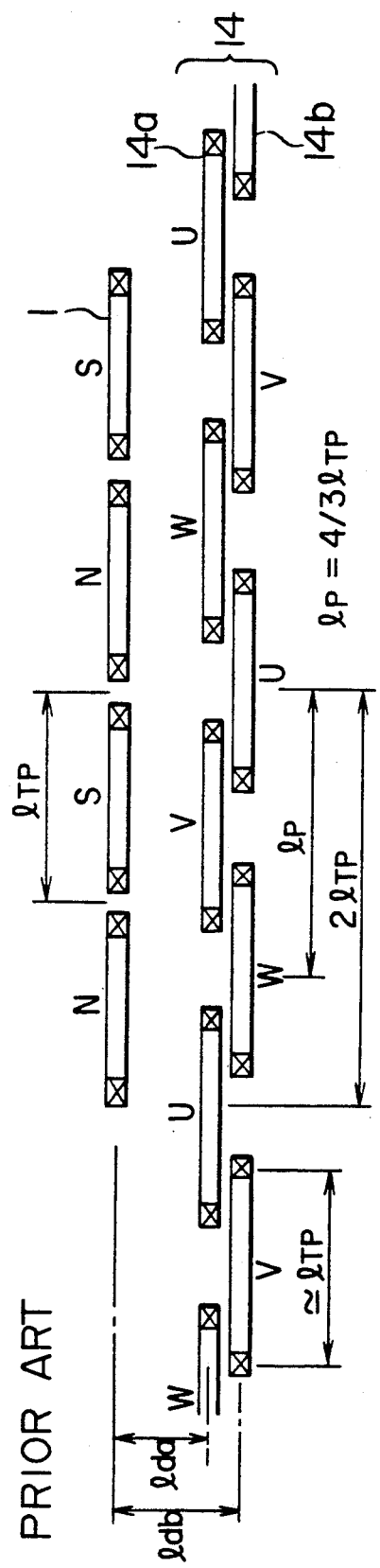

FIG. 3 is a sectional view of a practical embodiment of the present invention, while FIG. 4 is a diagram showing the relationship between the electromagnetic pulsating force and the ratio of magnetomotive force between the inner coil and the outer coil as observed in the embodiment shown in FIG. 3.

The embodiment shown in FIG. 3 has a superconductor coil of $1080^L \times 500^W$ (mm) and having magnetomotive force of 700 KAT, and a propulsion coil 2 of $1420^L \times 600^W \times 1800^P$ and spaced from the superconductor coil 1 by 257 mm. The propulsion coil 2 is composed of an inner coil 2a and an outer coil 2b which are disposed at a center-to-center distance of 47 mm. The coils are of the conventional race track shape.

In this embodiment, as will be seen from FIG. 4, the left and rightward electromagnetic pulsating force of frequency of 1.5 order is nullified when the ratio of the magnetomotive force between the inner coil 2a and the outer coil 2b is 1:1.25. The number of turns of the inner coil 2a and the outer coil 2b are determined to be 8 and 10, respectively, to achieve the desired results.

However, the number of turns of the propulsion coils are limited by the levels of the voltage and current used. It is not always possible to determine the ratio of the magnetomotive force between the inner coil 2a and the outer coil 2b to be 1:1.25. It is therefore advisable to determine the ratio of the turns within the range which appreciably reduces the pulsating force, as shown in FIG. 4. Where the physical dimensions of the coils are different, different spacings are used and/or different currents then the ratio of the magnetomotive necessary to achieve the desired result will be different. However, the necessary ratio may be easily calculated by requiring that the levels of mutual inductance developed between each of the coils and the superconductor coil be about the same.

In the embodiments described before, the inner coil 2a and the outer coil 2b have different number of turns so as to realize a suitable value of ratio of magnetomotive force therebetween. This, however, is only illustrative and the same advantage is brought about by an alternative arrangement in which the inner and outer coils have the same number of turns but are supplied with electrical currents of different levels so as to create the required ratio of magnetomotive force therebetween.

As will be understood from the foregoing description, the magnetically levitated vehicle propulsion system of the present invention is so constructed that the inner and outer coils forming the propulsion coil develop different levels of magnetomotive force, so as to reduce electromagnetic pulsating force caused by the 0.5 order space higher harmonic magnetic field due to the difference in the distance from the superconductor coil between the inner and outer coils, thus ensuring stable running of the vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a propulsion system for a magnetically levitated vehicle comprising a superconductor coil mounted on the vehicle and a propulsion coil fixed to a track rail for guiding said vehicle, said propulsion coil comprising an inner and outer coil disposed adjacent to each other, and therefore at different respective distances away from the superconductor coil, each of said inner and outer coils being a three phase coil, wherein the number of turns in the outer coil is greater than the number of turns of the inner coil such that the levels of mutual inductance developed between the inner propulsion coil and the superconductor coil and the outer propulsion coil and the superconductor coil are substantially the same.

2. The propulsion system of claim 1 wherein the levels of mutual inductance developed between the inner coil and the superconductor coil and the outer coil and the superconductive coil are such that the pulsating magnetic force generated when said vehicle is in motion is less than 10% of the total propulsion force.

3. The propulsion system of claim 2 wherein said pulsating magnetic force is less than 5% of the propulsion force.

4. The propulsion system of claim 1 wherein the ratio of electromagnetic force between the inner propulsion coil and the outer propulsion coil is about 1:1.25.

5. The propulsion system of claim 1 wherein the electromagnetic force between the inner propulsion coil and the outer propulsion coil is from 1:.15 to about 1:1.35.

6. The propulsion system of claim 1 wherein the ratio of electromagnetic force between the inner propulsion coil and the outer propulsion coil is from about 1.225 to about 1.275.

7. The propulsion system of claim 1 wherein the ratio of electromagnetic forces between the inner propulsion coil and the outer propulsion coil is between 1:1.12 and 1:1.3.

8. A propulsion system for a magnetically levitating vehicle comprising a superconductor coil having a north and south pole which are arranged alternatingly on said vehicle and a propulsion coil fixed to a track rail for guiding said vehicle, said propulsion coil having an inner coil and an outer coil disposed adjacent to each other, and therefore at different respective distances away from the superconductor coil, each of said inner and outer coils being a three-phased coil with the coil of each phase having the same length as a pole pitch of said superconductor coil, the coils of different phases of each of said inner and outer coils being arranged at a pitch which is 4/3 the pole pitch of said superconductor coil, the coils of the same phases of said inner and outer coils being spaced by a distance which is twice as large as that of the poled pitch of said superconductor coil, wherein different current levels are applied to said inner and outer coils such that the magnetomotive forces of said inner coil and said outer coils are different from each other such that the density of magnetic fluxes which interact between said inner coil and said superconductor coil is approximately equal to that interacting between said outer coil and said superconductor coil.

9. In a propulsion system for a magnetically levitated vehicle comprising a superconductor coil mounted on the vehicle and a propulsion coil fixed to a track rail for guiding said vehicle, said propulsion coil comprising an inner and outer coil disposed adjacent to each other, and therefore at different respective distances away from the superconductor coil, each of said inner and outer coils being a three phase coil, and wherein an amount of current applied to the outer coil is different from an amount of current applied to the inner coil such that the respective levels of mutual inductance developed between the inner propulsion coil and the superconductor coil, and the outer propulsion coil and the superconductor coil, are substantially the same.

* * * * *